Dec. 14, 1943.   W. B. GOODMAN ET AL   2,336,784
ENGINE LUBRICATION SYSTEM CONTROL
Filed Sept. 17, 1941   2 Sheets-Sheet 1

INVENTOR
WILLARD B. GOODMAN & KINGSLAND HOBEIN.
BY
ATTORNEY

Dec. 14, 1943.  W. B. GOODMAN ET AL  2,336,784
ENGINE LUBRICATION SYSTEM CONTROL
Filed Sept. 17, 1941   2 Sheets-Sheet 2
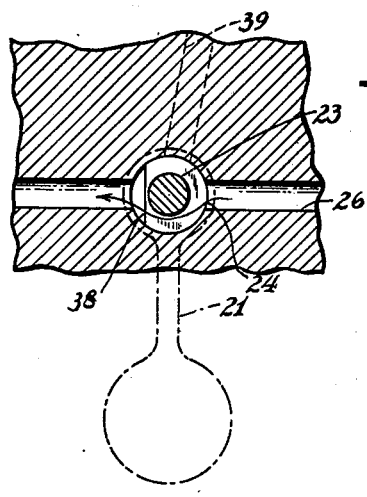
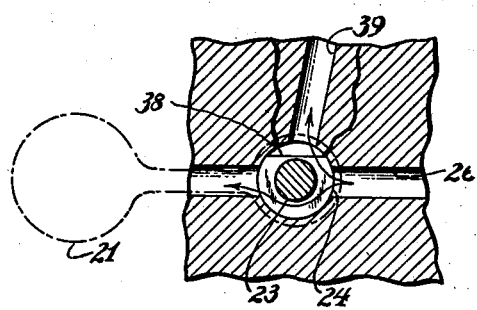
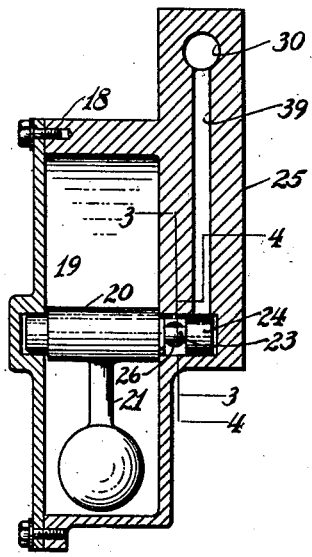
INVENTOR
WILLARD B. GOODMAN & KINGSLAND HOBEIN
BY
ATTORNEY Patented Dec. 14, 1943

2,336,784

UNITED STATES PATENT OFFICE 2,336,784

ENGINE LUBRICATION SYSTEM CONTROL

Willard B. Goodman and Kingsland Hobein, Los Angeles, Calif., assignors to Wright Aeronautical Corporation, a corporation of New York Application September 17, 1941, Serial No. 411,104

12 Claims. (Cl. 184—6)

This invention relates to lubrication systems for engines and is particularly concerned with improvements in pressure lubrication systems as used in aircraft engines.

Virtually all aircraft engines utilize a pressure feed, dry sump lubrication system wherein a pressure pump is used to withdraw lubricant from a reservoir when it is forced to the engine parts. Surplus oil spraying from the parts within the engine falls to a sump from which oil is withdrawn by a scavenge pump and returned to the reservoir. The engine, when an airplane is subjected to a dive, tends to overspeed, and during such overspeed needs a greater supply of oil for proper lubrication than is ordinarily available due to the fixed peak pressure to which the pressure system is limited by a set pressure relief valve. An object of the present invention is to provide means to augment oil pressure fed to the engine parts at such times as the engine tends to overspeed. A further object is to provide means responsive to engine position to control the oil pressure in the lubricating system while a further object is to provide a special valve, responsive in its operation to engine positions to direct pressure lubricant to the pressure relief valve in such a manner as to lock said valve closed. The "engine position" mentioned above may preferably be a "nose down" position occurring during an aircraft dive but the invention need not necessarily be restricted to the dive position.

Further objects of the invention will become apparent in reading the annexed description in connection with the drawings, in which.

Figure 2:
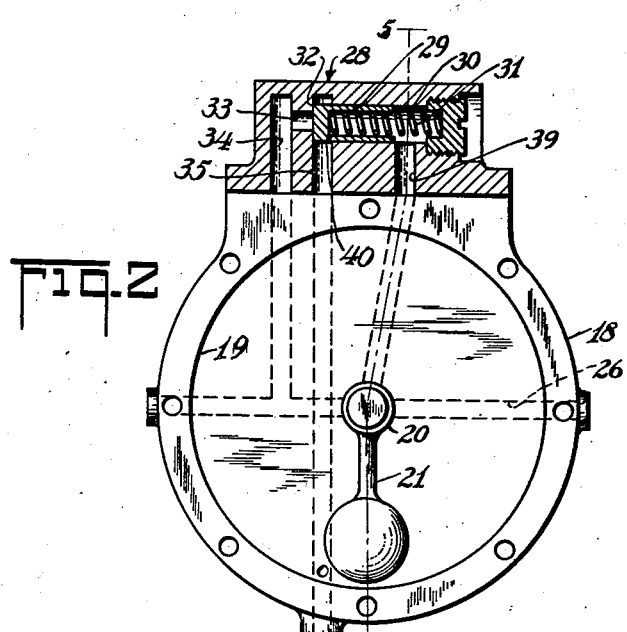
Fig. 2 is an enlarged side elevation, partly in section, showing the control mechanism of the invention.

Figs. 3 and 4 are similar sections through the control device in different positions of adjustment comprising respectively, sections on the lines 3—3 and 4—4 of Fig. 5; and Fig. 5 is a section on the line 5—5 of Fig. 2.

Figure 1:
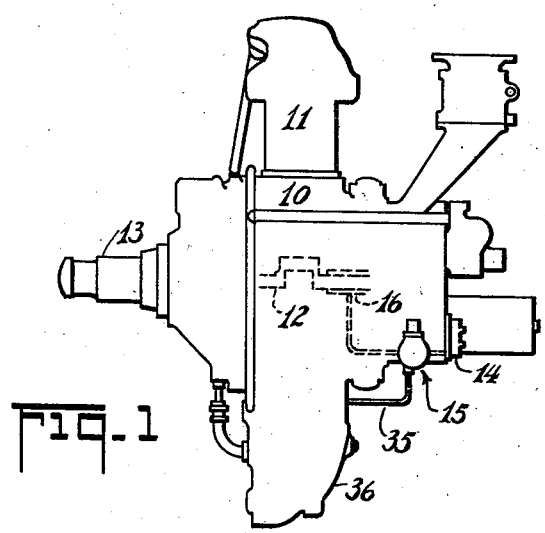
Fig. 1 is a side elevation, partly diagrammatic, showing an aircraft engine incorporating the invention.

The conventional engine shown in Fig. 1 includes a crankcase 10 provided with radially arranged cylinders 11 whose pistons and connecting rods, not shown, are connected to a crankshaft 12 driving a propeller shaft 13. A pressure oil pump is indicated at 14 which is fed from an external reservoir, not shown, and delivers oil through a control valve assembly 15 to a crankshaft bearing 16 and to other parts of the engine requiring lubrication. The valve assembly 15 is detailed in Figs. 2 to 5 and includes a circular housing 18 defining a circular pocket 19 in which is carried a mandrel 20 supporting a pendulum 21. The axis of the mandrel 20 is disposed parallel to the transverse axis of the aircraft in which the engine is installed so that the pendulum, under uniform flight speed conditions, will hang toward the earth regardless of the nose-up or nose-down attitude of the airplane. The mandrel 20 carries a reduced diameter portion 23 and a valve portion 24 which project into a valve housing 25 having a fore-and-aft drilling 26 alined with the necked down portion 23. One end of the drilling 26 is connected to the oil pump 14 while the other end is connected to the crankshaft bearing 16 or other means by which pressure lubricant is fed to the engine parts. As is obvious, the necked down portion 23 offers no obstruction to the free flow of lubricant from the pump to the engine. Within the housing 25 is a pressure relief valve 28 comprising a thimble 29 slidable in a bore 30 and urged toward the left, as shown in Fig. 2, by a spring 31. The face of the thimble 29 engages a seat 32 whose bore 33 is in free communication, through a drilling 34, with the drilling 26. That portion of the thimble 29 just to the right of the seat 32 communicates with a drilling 35 leading to the engine oil sump indicated at 36 in Fig. 1. The relief valve 28 is of more or less conventional construction and serves as a safety valve which opens in case the oil pressure delivered by the pump exceeds the strength of the spring 31, allowing surplus oil to return to the engine sump and controlling engine oil pressure to a maximum value.

The valve stem 24, as shown in Figs. 3, 4 and 5, is provided with a flat 38 which permits the passage of pressure lubricant from the drilling 26, at times, to a drilling 39 which enters the relief valve bore 30 to the right of the righthand end of the thimble 29. When the drilling 39 is open to oil pump pressure, substantially equal oil pressure is imposed on the opposite sides of the thimble 29 whereby the valve spring 31 holds the valve closed regardless of the pressure imposed by the oil pump, the valve thimble being hydraulically balanced. The pendulum 21 is so positioned with respect to the flat 38 on the valve stem as to open the drilling 39 to the drilling 26 when the engine axis is tilted forwardly and downwardly at a considerable angle. Fig. 4 shows the relative position of the pendulum and valve housing 25 under such nose down conditions, while Fig. 3 shows the pendulum in the normal level flight position with respect to the valve housing wherein the drilling 39 is cut off from communication with the drilling 26.

In operation, during climb or normal flight of the aircraft, the pendulum occupies the position shown in Fig. 3 and the relief valve 28 may function in its normal manner to limit maximum oil pressure. If the aircraft is placed in a nose down or diving attitude, the pendulum assumes the position of Fig. 4 by which oil pressure relief valve operation is eliminated whereby full oil pump delivery will be passed to the engine to take care of lubrication requirements during the critical high speed diving maneuver. When the aircraft levels off, the pendulum 21 will again return to the position of Fig. 3 and the pressure lubricant within the righthand end of the relief valve bore 30 will bleed into the scavenge drilling 35 and the relief valve may resume normal operation. The resumption of normal operation of the relief valve may be expedited by placing a small orifice such as is shown at 40, Fig. 2.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an engine comprising an oil pump delivering oil to the parts thereof and comprising a pressure relief valve elastically loaded to maintain a certain pressure in the system, means responsive to the tilting of said engine to an abnormal attitude to increase the load on said relief valve whereby to increase the oil pressure on the system.

2. In an engine comprising a pressure oiling system and a pressure control means therefor, means responsive in its operation to tilt of the engine from a normal attitude to adjust said pressure control means to maintain an increased pressure in the system.

3. In an engine comprising a pressure oiling system, means to provide oil under pressure thereto, and an oil pressure control device, means responsive to tilting of the engine to a certain position of adjustment to change said oil pressure control device to maintain higher pressure in the system.

4. In an engine comprising a circulating oiling system having an elastically loaded pressure relief valve therein, a member movable in response to engine position, and means operated by said member in certain positions thereof relative to the engine to increase the closing force on said pressure relief valve.

5. In an engine comprising a pressure lubricating system and having a pressure relief valve adapted to limit the normal maximum lubricant pressure, a pendulum operated valve fed by pressure lubricant, and means opened by said valve to admit pressure lubricant to said pressure relief valve to balance the normal pressure thereon.

6. In an engine comprising a pressure lubricating system and having a pressure relief valve subject on one side to pressure lubricant, elastic means urging said valve closed, and means responsive to engine position to direct pressure lubricant to the opposite side of said valve to aid said elastic means in urging said valve closed.

7. In an engine comprising a pressure lubricating system and having a pressure relief valve subject on one side to pressure lubricant, elastic means urging said valve closed, and means responsive to engine position to direct pressure lubricant to the opposite side of said valve to aid said elastic means in urging said valve closed, said engine position responsive means comprising a pendulum operated oil valve fed from the pressure system and feeding, when open, to said relief valve.

8. In an engine, a pressure control for a pressure lubricating system comprising a spring pressed valve subject to system pressure on one side, means to bleed oil passing said valve to the sump of the system, a fluid cavity in said valve adjacent said spring, and engine position responsive means to direct pressure fluid to said cavity.

9. In an engine pressure lubricating system, a relief valve comprising a bored housing having a valve seat at one end of the bore, a piston fitted to the bore and comprising a valve engaging said seat, a lubricant pressure conduit connecting to the bore end whereby lubricant pressure is imposed on said piston urging same off of the valve seat, said bore having a relief passage adjacent the seat through which lubricant passing said valve seat may discharge, spring means urging said piston toward said seat, and a fluid pressure connection to said bore selectively openable to admit fluid pressure to the bore and on the other end of the piston to assist said spring in urging the piston into valve seat engagement.

10. In an engine pressure lubricating system, a relief valve comprising a bored housing having a valve seat at one end of the bore, a piston fitted to the bore and comprising a valve engaging said seat, a lubricant pressure conduit connecting to the bore end whereby lubricant pressure is imposed on said piston urging same off of the valve seat, said bore having a relief passage adjacent the seat through which lubricant passing said valve seat may discharge, spring means urging said piston toward said seat, and a fluid pressure connection to said bore selectively openable to admit fluid pressure to the bore and on the other end of the piston to assist said spring in urging the piston into valve seat engagement, said selectively openable pressure connection including a pendulum actuated valve fed from said pressure lubricating system.

11. In an engine having a circulating oiling system, means operative to limit the pressure of the circulating oil, and means responsive to tilt of the engine to a certain position to render said pressure limiting means inoperative.

12. In an engine having a pressure lubricating system, a lubricating pressure relief valve resiliently biased in a closing direction against the pressure of said lubricant, and means operative in response to tilt of the engine to a predetermined position to provide a fluid pressure against said relief valve operable to increase the bias of said valve in a closing direction.

WILLARD B. GOODMAN.
KINGSLAND HOBEIN.